Patented June 5, 1923.

1,457,466

UNITED STATES PATENT OFFICE.

CLAUDE R. SMITH, OF WASHINGTON, DISTRICT OF COLUMBIA.

PROCESS OF PURIFYING GELATIN AND GLUE.

No Drawing.     Application filed June 19, 1920. Serial No. 390,253.

(FILED UNDER THE ACT OF MARCH 3, 1883, 22 STAT. L., 625.)

*To all whom it may concern:*

Be it known that I, CLAUDE R. SMITH, a citizen of the United States of America, and an employee of the Department of Agriculture, residing in the city of Washington, District of Columbia (whose post-office address is Department of Agriculture, Washington, D. C.), have invented a new and useful Process of Purifying Gelatin and Glue, of which the following is a complete description.

This application is made under the act of March 3, 1883, chapter 143 (22 Stat., 625), and the invention herein described and claimed, may be used by the Government of the United States or any of its officers or employees in the prosecution of work for the Government, and any person in the United States either in public or private work, without payment to me of any royalty thereon.

Glue and gelatin of commerce always contain mineral matter, free acids or alkalies, in amounts from about 1 to 7 per cent. Hitherto even scientific investigators have only been able to incompletely eliminate any or all of these impurities. The process to be described has been found invariably to yield the new product, namely, gelatin purified from ash or electrolytes (volatile or non-volatile).

Gelatin or glue of commerce is pulverized fine, preferably about 16 mesh. It is washed with several portions of a cold solution of common salt (about 10% in strength) in distilled water containing about 5 cc. of concentrated hydrochloric acid to the liter. The washings are tested for lime by heating with ammonium oxalate until absence of a precipitate shows all lime has been removed.

Washing is now continued with cold solutions of common salt without the acid and containing less and less proportion of salt until finally distilled water containing only 0.1% and less of common salt is used. Finally, only cold, pure distilled water is used for washing until no test for chlorine ions is obtained when tested with silver nitrate.

The jelly masses are dried with a fan with or without final washing with pure ethyl alcohol or other similar readily volatile solvent.

In so far as I have developed the theory of the process the following explanation is offered: The acidulated salt solution reacts with the calcium, iron, aluminum, and other compounds producing diffusible chlorides which readily wash away. Continuing the washing with rapidly diminishing solutions of common salt serves to permit the removal of excess acid while controlling the swelling—a very important consideration. The method thus combines intensive dialysis with controlled swelling.

In practice I prefer to wash with distilled water (free from ammonia) even after the silver nitrate test shows absence of chlorine ions to make sure no salt or acid has been left.

The following experiments may serve as a typical example:

Place 10 grams of finely powdered gelatin (about 16 mesh) in a 24 cm. folded filter supported by cone or small funnel at the tip of the filter and the whole placed in suitable size funnel (15 cm.). A 10% sodium chloride solution containing about 5 cc. of conc. hydrochloric acid per liter, cooled to between 0° and 10° C., is poured back and forth several times through the powdered gelatin. Then fresh portions of the salt acid mixture are used until no test for lime can be obtained in the washings. (Heat with ammonium oxalate). Replace this acid mixture by cold 1% salt solution without acid, washing back and forth. From now on the salt solutions are as rapidly diminished in concentration as control of the swelling will permit.

A considerable washing will be required with very dilute salt solution and finally with distilled water until no test for chlorine ions can be obtained in the washings. It is well to continue the washing with several liters of distilled or aerated distilled water or conductivity water if high purity is to be made certain. Cold 90% alcohol is poured over the drained jelly masses until shrunk nearly to dryness and finally dried with an electric fan.

While the method given makes use of common salt (sodium chloride) other electrolytes such as ammonium chloride, potassium bromid, etc., may be substituted but they offer no advantages and are comparatively more expensive.

The new product as obtained when incinerated leaves no trace of ash other than traces of sand when the original glue or gelatin contains such. When ashed with pure sodium carbonate and chlorine ions are tested for (after the removal of the hydrocyanic acid) by silver nitrate, no test is obtained. I am further unable to detect sulphates, phosphates, or other impurities.

The new product, besides its freedom from salts, acids and alkalies, is characterized by the property of completely separating from its cold dilute solutions in water (say one-half per cent) into flocks of jelly particles which can be readily filtered from the excess of water. The merest trace of an alkali or acid (univalent ones in particular) prevent this phenomenon.

I claim:

A process of purifying gelatin and glue free from mineral matter, acids and alkalies which comprises extensive dialysis with acidified salt solutions, then consecutive applications of neutral salt solutions of gradually decreased strengths, and finally pure water.

CLAUDE R. SMITH.